UNITED STATES PATENT OFFICE.

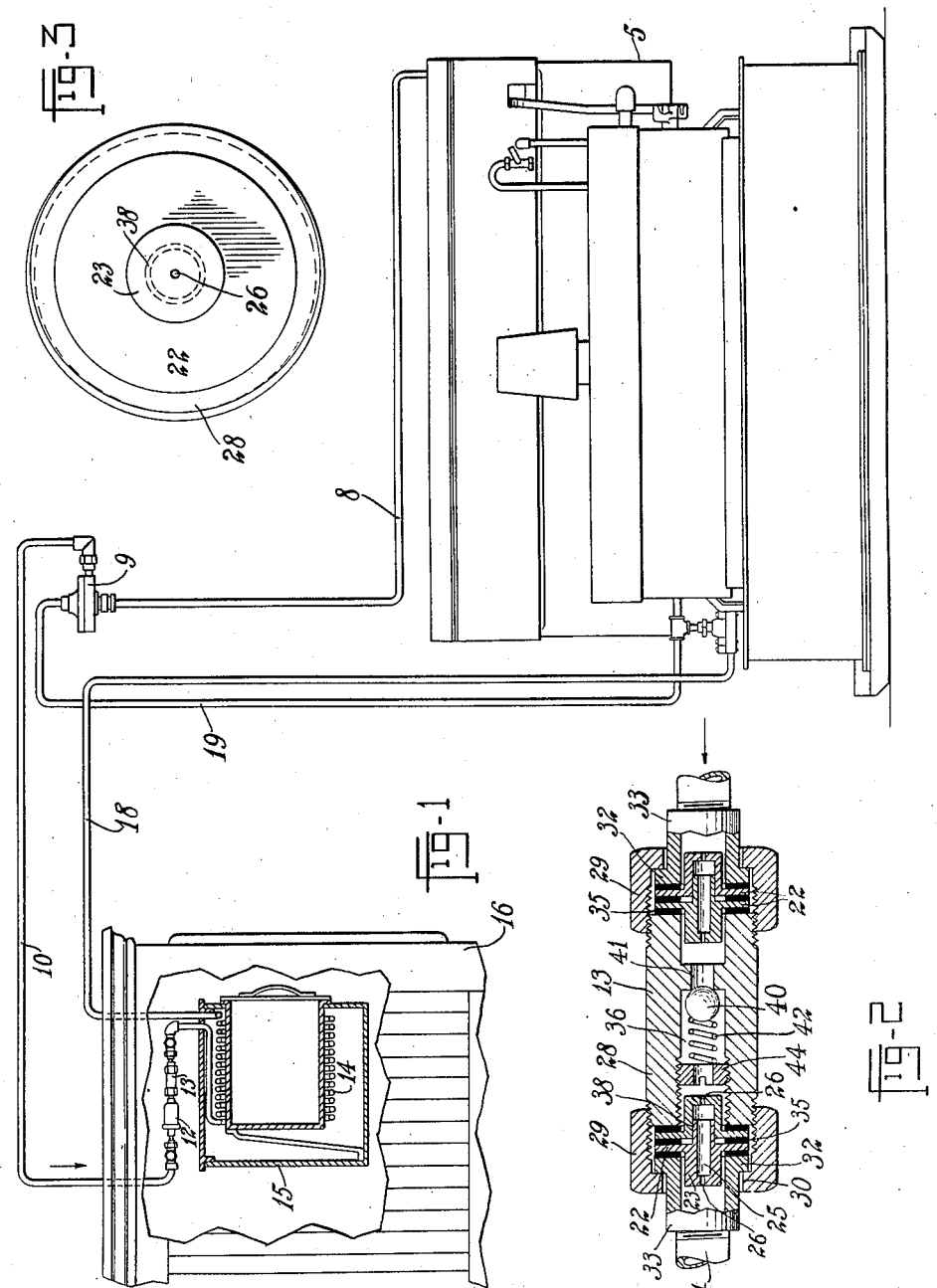

HARRISON H. SOUTHWORTH, OF CLEVELAND, OHIO, ASSIGNOR, BY MESNE ASSIGN-MENTS, TO THE ICELESS MACHINE COMPANY, OF CLEVELAND, OHIO, A CORPORATION OF OHIO.

PRESSURE-REDUCING DEVICE FOR REFRIGERATING APPARATUS.

1,162,319.      Specification of Letters Patent.      Patented Nov. 30, 1915.

Application filed June 11, 1914. Serial No. 844,599.

*To all whom it may concern:*

Be it known that I, HARRISON H. SOUTH-WORTH, a citizen of the United States, residing at Cleveland, in the county of Cuyahoga and State of Ohio, have invented a certain new and useful Improvement in Pressure-Reducing Devices for Refrigerating Apparatus, of which the following is a full, clear, and exact description, reference being had to the accompanying drawings.

This invention relates to a pressure-reducing device adapted for use in a passage for fluid under pressure, permitting it to pass from the device at a comparatively lower pressure. It is particularly adapted for use with light volatile liquids or gases, such as ammonia, and may be conveniently and advantageously used in refrigerating systems of the absorption type.

An object of my invention is to provide such a pressure reducing device which shall be comprised of a few simple parts of such a nature that they may be cheaply manufactured and may not be liable to get out of order.

Another object is to so construct the parts that they may be cheaply manufactured, while comprising a reducing device efficient and durable in service, having its parts readily interchangeable to obtain different relative pressures.

My reducing device is composed of a plurailty of members having fixed openings which the fluid must pass successively and which are adapted to be mounted in a casing interposed in the passage. These members are adapted to be used in pairs, and are chambered so that a small expansion chamber is provided between each pair, which greatly adds to the efficiency of the device.

My invention is hereinafter more fully described in connection with the drawings, and the essential characteristics are set forth in the claims.

Figure 1 is a diagrammatic view of a refrigerating apparatus, with which my pressure-reducing device may be conveniently used; Fig. 2 is a longitudinal central section through the pressure reducing device, and Fig. 3 is an end view of the pressure reducing device, with pipe couplings removed showing one of the reducing members.

Referring to the drawings by reference numerals, 5 indicates a refrigerating apparatus of the absorption type, having a suitable generator and absorber and a condenser for the anhydrous ammonia from which leads a pipe 8 through a suitable control valve 9, and a pipe 10, through a strainer 12, to my pressure reducing or expansion device 13, through which the fluid passes to the usual expansion coils 14, mounted in a brine tank 15 within the refrigerator proper, 16. From the coils 14, a return pipe 18 leads to the absorber of my apparatus. A pipe 19, as shown, leads from the control valve 9 to the absorber to provide for fluid, leaking through this valve, being retained in the system.

The pressure reducing device comprises, as shown, a series of small disks 22 having substantially cylindrical intermediate bosses 23, each having an axial bore 25 leading to an end wall through which is made a very small opening 26. These devices which I prefer to call fixed opening devices, are removably secured in a casing or fitting interposed in the passage, and comprising a member 28 having external threads at one end, to receive a threaded collar 29 having a flange 30. This flange engages an outwardly extending flange 32 on a threaded fitting 33, adapted to receive the pipe connection, as at 34, forming a portion of the line 10. The fixed opening devices are clamped into position with suitable packing 35, between them, engaging their peripheries, so that their bosses and openings are in the passage 36, leading through the members 28 and 33.

To accomplish the most efficient reduction of the pressure by means of these fixed opening devices, they are preferably arranged in pairs with their hollow bosses projecting away from each other, and are preferably held in alinement by means of a cylindrical projecting portion 38 having the same exterior diameter as the interior of the lugs or boss 23. The bore of the member having the projection 38, being somewhat smaller than the bore of the opposite member, provides a suitable thickness of the metal on this projection.

When used with a refrigerating device of the character described, I prefer to use at least two pairs of these devices associated as described, and accordingly on the opposite end of the member 28 I have provided a second member 29, threaded thereto and clamping in place a second pipe fitting member 33. Between this and the member 28, are held the fixed opening devices 22, arranged as just described. The member 28 has a longitudinal passage through which the fluid may pass. I prefer to provide in this passage, a suitable check valve comprising a ball 40, held against a seat formed by a contracted portion 41 of the passage in the member 28, by means of a spring 42. The opposite end of the spring bears against an externally threaded plug 44 having a central passage and a suitable slot for a screw driver, its threads fitting into a threaded portion in the member 28.

Now it will be seen from the foregoing description that any fluid passing from the pipe 10 through my device to the refrigerating coils, must pass through the small openings 26, and in passing through these openings it comes into the chambers formed by the bores 25, from which it must pass outwardly through the next opening 26. Flowing in the direction of the arrow in Fig. 2, it must first pass through the pair of openings at the right, and the small expansion chamber formed by the bores 25 of this pair, then after passing the check valve must pass through a second pair comprising in all four small openings and two small expansion chambers, as well as the expansion chambers formed by the passages through the member 28 and the passages leading from the pair at the left.

When used with a refrigerating apparatus, the liquid ammonia is caused to pass through several small openings and it is also caused to pass through small expansion or eddy chambers each of which steps the pressure down and allows expansion of the liquid, which also adds to the retarding action on the liquid. It will be seen that these fixed opening devices or disks, may be readily manufactured and conveniently assembled into such a device as described, and when so assembled provide a pressure reducing device the parts of which are not liable to get out of order. These fixed opening disks being removable, allows the substitution of others having different sizes of openings, to provide for variations in this reduction in pressure. If desired, additional pairs of these devices may be added at either end of the member 28, merely interposing a cylindrical collar between the outer member 22 and the pipe fitting member 33, then providing a flanged collar 29 of sufficient length to extend over both of these pairs of devices and the collar. In this manner any convenient number of them may be used to provide the desired reduction in pressure.

Having thus described my invention, what I claim is:

1. The combination of a casing, a pair of coöperating members therein each consisting of a disk having a central hollow boss with a small opening through it, the bosses extending in opposite directions, a gasket between said disks, and means for clamping the disks upon the gasket.

2. The combination of a member consisting of a disk with a hollow boss extending therefrom having an opening through its end, a coöperating member having a disk provided with a hollow boss with an opening and having a tubular projection on the side opposite the boss, and means for clamping the members in place with the tubular projection extending into the hollow boss of the other member.

3. The combination of a casing, two partition members extending across the same and each having an opening through it, at least one of said members having a hollow boss, the opening being through the wall at the end of the boss and the two members having lateral flanges between which is clamped a packing washer.

4. The combination in a pressure reducing device of a member having a wall and a fixed opening therethrough much smaller in diameter than the thickness of the wall, and having a laterally extending portion, and means for interposing said members in a passage to cause liquid in the passage to pass only through said opening.

5. The combination in a pressure reducing device of a casing interposed in a passage, a wall in said casing, a chamber extending laterally from said wall and having a small fixed opening through which liquid must pass, and means for partially closing the other side of the chamber.

6. The combination of a member comprising a disk having a hollow boss with an opening through its end, a second member comprising a disk with a hollow boss having an opening through its end, said member having also a tubular extension extending in the opposite direction from the boss and adapted to occupy the boss of the other member, three washers, one between the disks and the other two on the outer sides of the respective disks, and means for clamping said washers and disks together.

7. In a pressure reducing device, the combination of a casing, a pair of disk-like members secured in the casing and having laterally extending bosses, chambers formed within said bosses, means for removably clamping said disk-like members side by side and securing them in a pipe line, and fixed openings through said bosses whereby liquid must pass first through one of the openings into said chamber and thence from the other opening.

8. In a pressure reducing device, the combination of a casing member having threads, a shoulder, a pair of small cylindrical chamber members having laterally extending flanges, means coöperating with said threads for clamping said members in place against said shoulder, small fixed openings in said members leading into said chambers, said casing being interposed in a passage whereby liquid in passing along the passage must first pass through one of said openings and into a chamber and then from the other opening.

9. In a pressure reducing device, the combination of a member having a passage therethrough and a shoulder, a disk-like member having a cylindrical boss extending from its central opening and a small fixed opening through the end wall of said boss, a second member having a hollow boss extending from its center having a small fixed opening leading to its interior, and having a hollow cylindrical portion extending from its opposite side and projecting into the hollow boss of the adjacent member, and means for clamping them in position against said shoulder.

10. In a pressure reducing device, the combination of a longitudinal member having a passage therethrough threaded at each end and a shoulder at each end, of disk-like members having hollow bosses at their center with closed ends except for small fixed openings leading thereinto and being so positioned that when clamped side by side a small chamber is formed between said members, and means for clamping a pair of said disks against said shoulders.

11. In a pressure reducing device, the combination of a longitudinal casing member having a passage therethrough, threads at each end, a flanged chambered member having small openings therethrough adapted to be arranged in pairs forming a small chamber between them, and means for clamping said pairs of members at ends of the first mentioned member, said means being adapted to be connected to pipes and a check valve between said pairs of members in the casing member.

12. The combination with a body portion of a casing, of two end portions removably secured to the opposite ends of the body, two pairs of partitions clamped between the ends of the body and such end portions, each pair of partitions having through it small holes spaced apart.

13. The combination with a body portion of a casing, of two end portions removably secured to the opposite ends of the body, two pairs of partitions clamped between the ends of the body and such end portions, each pair of partitions having through it small holes spaced apart, and a check valve located in an intermediate portion of the body.

14. The combination of a body having a valve seat, a suitable plug therefor, a spring tending to seat said plug, recesses in the opposite ends of the body, a pair of thimbles, two pairs of partitions, means for clamping a thimble and a pair of partitions to each end of the body, each pair of partitions being spaced apart and having small openings through its members.

15. In a device of the character described, the combination of an intermediate body portion, a pair of inwardly flanged nuts screwing onto the ends thereof, a pair of outwardly flanged thimbles held in place opposite the ends of the body by said nuts, two pairs of partitions clamped by said nuts between the thimbles and ends of the body, each partition consisting of a disk with a tubular boss having a hole through its end, the partitions of a pair being placed with the bosses extending in opposite directions and being separated by a washer, and a check valve between the pairs of partitions comprising a ball and a compression spring tending to force it to its seat.

In testimony whereof, I hereunto affix my signature in the presence of two witnesses.

HARRISON H. SOUTHWORTH.

Witnesses:
 ARCHER W. RICHARDS,
 JUSTIN W. MACKLIN.